(12) United States Patent
Waschke et al.

(10) Patent No.: US 7,034,950 B2
(45) Date of Patent: Apr. 25, 2006

(54) LASER GRID FOR MEASURING DISTANCE

(75) Inventors: Holger Waschke, Cremlingen (DE); Peter Mengel, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/841,445

(22) Filed: May 10, 2004

(65) Prior Publication Data

US 2005/0007348 A1 Jan. 13, 2005

Related U.S. Application Data

(63) Continuation of application No. PCT/DE02/03996, filed on Oct. 23, 2002.

(30) Foreign Application Priority Data

Nov. 8, 2001 (DE) ............................. 101 54 797

(51) Int. Cl.
  *G01N 21/00* (2006.01)
  *G01C 3/00* (2006.01)
  *G01J 5/02* (2006.01)

(52) U.S. Cl. .................... 356/614; 356/3.05; 356/3.06; 250/221; 250/341.7

(58) Field of Classification Search ........ 356/614–625, 356/3.05, 3.06, 4.06; 250/221, 341.7, 559.4, 250/561, 559.47
See application file for complete search history.

(56) References Cited

U.S. PATENT DOCUMENTS

| | | | | |
|---|---|---|---|---|
| 4,317,137 A | | 2/1982 | Thompkins | |
| 4,634,272 A | * | 1/1987 | Endo | 356/5.03 |
| 4,656,462 A | * | 4/1987 | Araki et al. | 340/556 |
| 4,742,337 A | * | 5/1988 | Haag | 340/556 |
| 4,884,008 A | * | 11/1989 | Bossler et al. | 315/152 |
| 4,902,126 A | | 2/1990 | Koechner | |
| 4,973,837 A | * | 11/1990 | Bradbeer | 250/221 |
| 5,142,152 A | * | 8/1992 | Boiucaner | 250/341.7 |
| 5,225,689 A | * | 7/1993 | Buckle et al. | 250/559.4 |
| 6,029,105 A | * | 2/2000 | Schweizer | 701/45 |
| 6,130,437 A | * | 10/2000 | Cerny et al. | 250/559.4 |
| 6,265,709 B1 | * | 7/2001 | Olson et al. | 250/221 |
| 6,509,958 B1 | * | 1/2003 | Pierenkemper | 356/5.01 |

FOREIGN PATENT DOCUMENTS

| | | |
|---|---|---|
| DE | 41 19 797 C2 | 1/1993 |
| DE | 44 05 376 C1 | 2/1995 |
| DE | 196 34 269 A1 | 2/1998 |
| DE | 197 57 595 A1 | 7/1999 |
| WO | WO 96/18114 A1 | 6/1996 |

OTHER PUBLICATIONS

Profos/Pfeifer, "Handbook of Industrial Measurement Techniques", 5th Edition, Munich, Oldenbourg, (1992), p. 474.
L. Leiseder, "Contactless Protective Devices", Technische Rundschau, vol. 67, No. 43 (1975), pp. 11/13.
Meinert, "Hintergrundausblendung Bei Lichttastern", Feinwerktechnik + Messtechnik, Carl Hanser Verlag, vol. 97, No. 6, (Jun. 1, 1989), pp. 261-264.

* cited by examiner

*Primary Examiner*—Gregory J. Toatley
*Assistant Examiner*—Sang H. Nguyen
(74) *Attorney, Agent, or Firm*—Sughrue Mion, PLLC

(57) ABSTRACT

The laser grid (1) permits a single-sided installation in order to record a person or object in the monitoring area. The grid operates using punctiform sensor units (3), each including at least one laser diode and two photosensitive pixels. The sensor units are arranged in a line in a housing (2).

10 Claims, 2 Drawing Sheets

4 Clock Generator
5 Analog-to-Digital Converter
6 Processing Logic Circuit
9 Interface 4 Clock Generator
5 Analog-to-Digital Converter
6 Processing Logic Circuit
9 Interface

LASER GRID FOR MEASURING DISTANCE

This is a Continuation of International Application PCT/DE02/03996, with an international filing date of Oct. 23, 2002, which was published under PCT Article 21(2) in German, and the disclosure of which is incorporated into this application by reference.

FIELD OF AND BACKGROUND OF THE INVENTION

The invention relates to a light grid having a number of transmitting and receiving elements.

Such light grids having a number of individual light barriers arranged in the form of a line are used, e.g., to secure a danger area. Upon intrusion by a person, or, generally, an object, into the monitoring area, the light beams are interrupted, and a switching operation is thereupon triggered, for example, a warning signal or a reliable shutdown of a machine.

Conventional light grids require the installation of a transmitter and a receiver at the outermost limits of access to the danger area, or, at a minimum, a mirror on one side and a combined transmitter/receiver module on the other. Moreover, with these light grids it is possible only with a high outlay to define differing areas upon the violation of which different system reactions are triggered.

OBJECTS OF THE INVENTION

It is one object of the invention to improve a light grid of the above-described type to the effect that installation on only one side of the monitoring area is needed in order to detect an object in the monitoring area.

SUMMARY OF THE INVENTION

This and other objects are achieved, according to one formulation of the invention, by an arrangement in which the transmitting and receiving elements are combined into punctiform sensor units that, in each case, have at least one laser diode and two photosensitive pixels and that are arranged in a line in a housing.

BRIEF DESCRIPTION OF THE DRAWINGS

An embodiment of the invention is explained in more detail below with the aid of a drawing, in which.

DETAILED DESCRIPTION OF THE PREFERRED EMBODIMENTS

Figure 1:
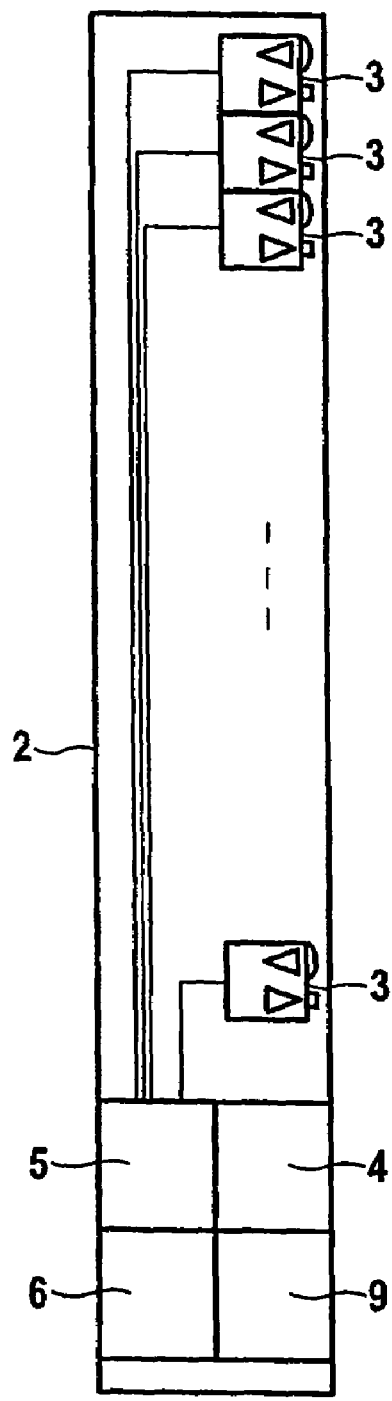
FIG. 1 shows a laser light grid according to the invention.

An inventive laser light grid 1 for distance measurement is illustrated as a module in FIG. 1. It has a housing 2 in which there are arranged, in the form of a line, punctiform sensor units 3 that are designed as 3D CMOS sensor units (see German patent DE 197 57 595 C2). The measuring principle of these sensor units 3 is explained in the DE 197 57 595 C2 patent, which is incorporated into the present application hereby by reference. The sensor unit 3 includes a laser diode and at least two photosensitive pixels that use different time windows to integrate the intensity of the reflected light of the associated laser diode.

Figure 2:
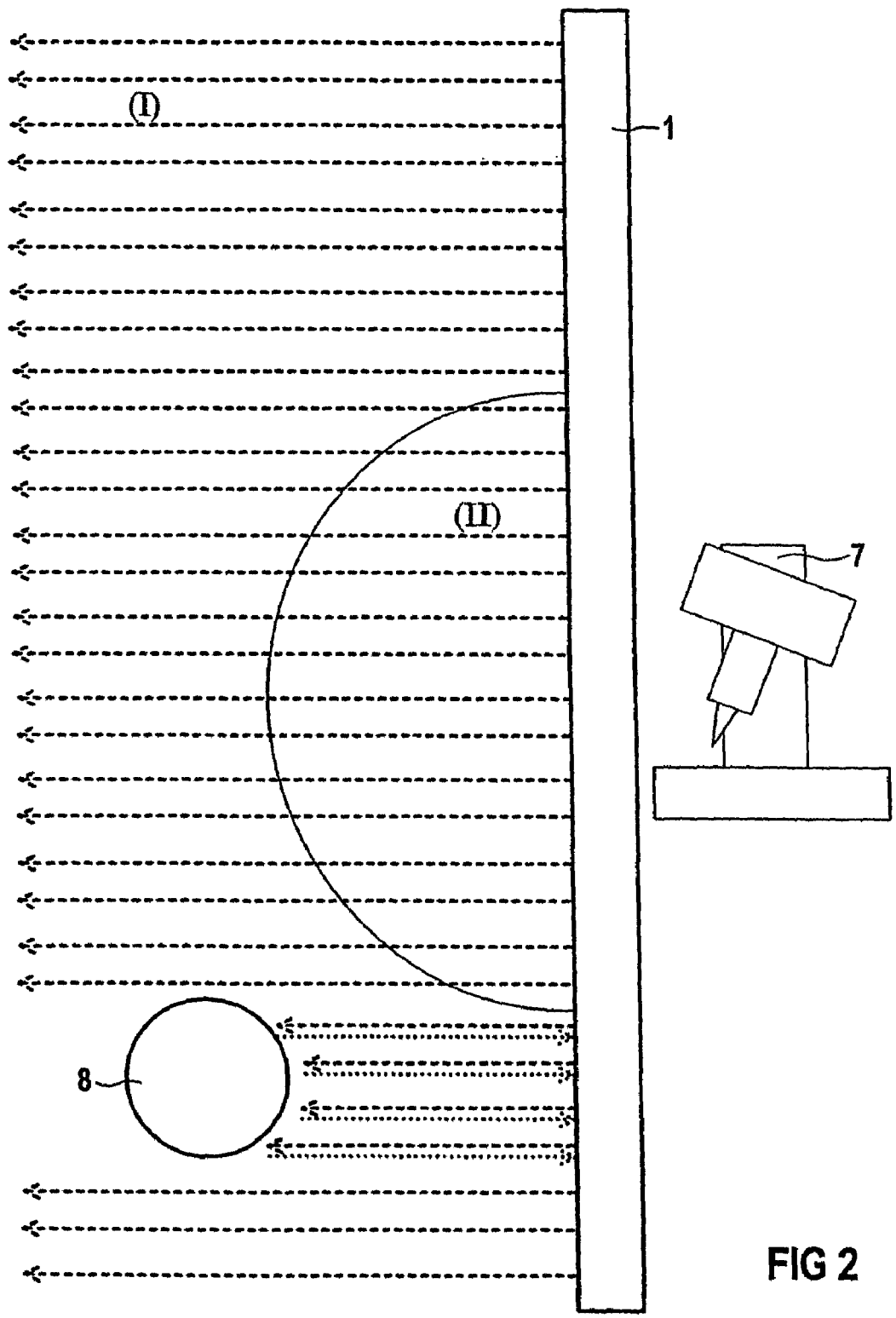
FIG. 2 shows an arrangement for monitoring the surroundings of a machine with the aid of the laser light grid in accordance with FIG. 1.

A clock generator 4, an analog-to-digital converter 5 and a processing logic circuit 6 are also located in the closed housing 2. The sensor units 3 are triggered one after another by the clock generator 4 and carry out, independently of one another, individual measurements that are then available as analog measured values at the sensor unit 3. Carried out per sensor unit in the present exemplary embodiment are two measurements in respect of which the analog measured values are read out by the analog-to-digital converter 5 and made available to the downstream processing logic circuit 6 for further processing. The processing logic circuit 6 can be wired or programmed to take on any or all of the following functions, in order to fulfill the monitoring task:

a) Calculation of the distance to each pair of measured values in accordance with the method in the above-named patent specification.

b) With the aid of a background filter, background filtering the measured values, which subtracts the measured values from a set of static background values, in order to be able to detect a change. The background picture can be stored by a zero measurement at startup, or through programming.

c) With the aid of a threshold filter, threshold filtering the measured values, in order to identify objects, e.g. persons, in different approach zones, e.g. as illustrated in FIG. 2. For example, a machine 7 is approached here. The presence of a person 8 inside the different approach zones I and II in FIG. 2 can be detected by the two-dimensional measurement, by distance from the light grid and position along the light grid. Thus, for example, upon intrusion into zone I, it is possible to issue a warning signal, and upon intrusion into zone II the machine 7 can be reliably shut down. Since the sensor units 3 can be appropriately selected tocarry out a distance measurement with accuracies in the centimeter range, it is also possible to define differently shaped approach zones.

d) A logic operation on the individual measurements of the sensor units 3 in FIG. 1, for the purpose of approximate detection of the size of the object, for example, in order to filter very small objects.

e) A muting function, i.e., specific blanking out of one or more individual measurements, for example, e.g., in order to permit specific objects to approach. This function would be required, for example, were there a need to feed objects to a production line.

The processing logic circuit 6 in accordance with FIG. 1 can be connected via an interface 9 to an external measuring and monitoring system that then converts the status message of the laser light grid 1 in a concrete fashion into a switching reaction, for example, interrupting the power supply to a machine. The interface 9 can be configured differently depending on the application. Thus, relay outputs or optocouplers, AS interface bus couplings, I2C bus couplings or the industrial Ethernet are possible, depending on how many individual items of information of a laser light grid 1 are required, and how many such modules are combined.

I2C bus and ASI bus also permit the very simplest cablings and the rapid transmission of more complex data.

If a firm background, for example a wall, is provided permanent self-monitoring can be performed for safety-related applications by executing comparisons with programmed basic data.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A distance measuring light grid comprising:
   a plurality of transmitting and receiving elements arranged in punctiform sensor units that respectively have at least one laser diode and two photosensitive pixels; and
   a housing in which the sensor units are arranged in a line,
   wherein the housing comprises a clock generator, an analog-to-digital converter and a processing logic circuit,
   wherein the clock generator is configured to trigger the sensor units,
   wherein the sensor units are configured to execute individual measurements and provide analog measured values,
   wherein the analog-to-digital converter is configured to output the measured values to the processing logic circuit, and
   wherein the processing logic circuit is configured to process the measured values.

2. The distance measuring light grid as claimed in claim 1, wherein the sensor units are 3D CMOS sensors.

3. The distance measuring light grid as claimed in claim 1, wherein the processing logic circuit is configured to calculate at least one distance from the measured values.

4. The distance measuring light grid as claimed in claim 1, wherein the processing logic circuit comprises a background filter that subtracts the measured values from a set of static background values.

5. The distance measuring light grid as claimed in claim 1, wherein the processing logic circuit comprises a threshold filter for identifying an object in a plurality of differing approach zones.

6. The distance measuring light grid as claimed in claim 1, wherein the processing logic circuit is configured to logically combine the measured values of a plurality of the sensor units and to detect a size of an object from the combined values.

7. The distance measuring light grid as claimed in claim 1, wherein the processing logic circuit comprises a muting function configured to mask out at least one of the measured values.

8. The distance measuring light grid as claimed in claim 1, wherein the housing further comprises an interface configured to interconnect the processing logic circuit to an external measuring and monitoring system.

9. A light grid comprising:
   a plurality of sensor units mounted to form a sensor row, each of the sensor units comprising at least one laser diode and two photosensitive pixels, wherein each of the sensor units is configured to register an object in a laser path of the laser diode; and
   a housing mounting the sensor row,
   wherein the housing comprises a clock generator, an analog-to-digital converter and a processing logic circuit,
   wherein the clock generator is configured to trigger the sensor units,
   wherein the sensor units are configured to execute individual measurements and provide analog measured values,
   wherein the analog-to-digital converter is configured to output the measured values to the processing logic circuit, and
   wherein the processing logic circuit is configured to process the measured values.

10. The light grid as claimed in claim 9, wherein the housing comprises at least one signal processor processing output signals from the plurality of sensor units into an object distance measurement.

* * * * *